United States Patent [19]
Lewis

[11] Patent Number: 6,092,096
[45] Date of Patent: *Jul. 18, 2000

[54] ROUTING IN DATA COMMUNICATIONS NETWORK

[75] Inventor: Jonathan Rhys Lewis, Winchester, United Kingdom

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,784

[22] Filed: May 30, 1997

Related U.S. Application Data

[63] Continuation of application No. PCT/GB95/01693, Jul. 18, 1995.

[30] Foreign Application Priority Data

Nov. 30, 1995 [GB] United Kingdom .................... 9424442

[51] Int. Cl.[7] .................................................. H04L 12/24
[52] U.S. Cl. ............................................ 709/200; 370/396
[58] Field of Search ....................... 370/396; 395/200.09, 395/200.02; 709/200; H04L 12/24

[56] References Cited

U.S. PATENT DOCUMENTS 4,679,189   7/1987   Olson et al. ............................ 370/396

FOREIGN PATENT DOCUMENTS 426911   6/1989   European Pat. Off. ........ H04L 12/24

OTHER PUBLICATIONS

William A. Shay, Understanding Data Communications And Networks, Jan. 1994.

*Primary Examiner*—Glenton B. Burgess
*Assistant Examiner*—Chuong Ho
*Attorney, Agent, or Firm*—Jeanine Ray-Yarletts; Jack V. Musgrove; Andrew J. Dillon

[57] ABSTRACT

The Data communication systems and methods in which information for routing of messages between nodes of a communications network is provided by a directory service (such as the DCE directory service), accessible from all network nodes. The provision of such information by the directory service removes the requirement for routing tables to be set up and maintained at each of the network nodes, whose maintenance can involve considerable network traffic in dynamically changing networks or problems of inconsistent data being held at different nodes.

14 Claims, 4 Drawing Sheets

| NODE NAME | LOCAL CONNECTIONS | EXTERNAL CONNECTIONS |
|---|---|---|
| N1 | N2, N4 | N8, GDS |
| N2 | N1, N3 | GDS |
| N3 | N2, N7 | GDS |
| N4 | N1, N5 | GDS |
| N5 | N4, N6 | GDS |
| N6 | N5, N7 | GDS |
| N7 | N3, N6 | GDS |

ROUTING IN DATA COMMUNICATIONS NETWORK

CROSS-REFERENCE TO RELATED PATENT APPLICATION

The present invention is a continuation of Patent Cooperation Treaty Application No. PCT/GB95/01693 (IBM Docket No. UK9-94-048N) entitled "Data Communications," filed Jul. 18, 1995.

BACKGROUND OF THE INVENTION

1. Technical Field

The present invention relates to an improved method and system for providing data communications and, in particular, to an improved method and system for providing data communications within a distributed computing network. Still more particularly, the present invention relates to an improved method and system of providing route determination information used to determine a route within a distributed computing network for data communications utilizing a distributed directory service.

2. Description of the Prior Art

A distributed data processing system typically consists of a number of data processors interconnected by a data communications network. In a distributed system, data and programs for processing the data may be stored at several network sites with the object of locating them near to the network locations at which they are most commonly accessed. This avoids dependence on a single central processor providing all processing functions and can reduce the data traffic and communications delays within the communications network. Distributed networks of processors are increasingly prevalent due to great technological advances in providing powerful processes at every level of the system (e.g. workstations with powerful processors are now able to run quite complex applications) and in providing communications networks to enable these processes to cooperate.

The importance of distributed processing has also increased with the increased potential for related users of information systems to share information, such as between different business enterprises who serve the same customers and who each may have their own respective intra-enterprise data communications facilities. Communications networks can be worldwide and of any size and complexity (the simple network configurations such as where all nodes are directly connected to a single central node or where every node is directly connected to every other are not feasible with networks of any significant size).

While computer networking has produced gains in productivity and efficiency, it has also introduced the problem of how to enable cooperation between disparate communication networks and operating platforms (which may be created by different vendors) so that they can interoperate, allowing businesses to integrate all of their data processing resources.

An essential requirement of distributed data processing systems is the provision of efficient routing of communications between cooperating processes which may be located at different network locations. Indeed, effective routing is required in any communications network. Existing networking software performs the routing function in a variety of ways, generally involving large amounts of network configuration data being held at each network node. The term network node is used herein to refer to any network entity from and to which data communications may be routed, comprising one or more computer programs installed on a particular hardware device and having a defined name and/or address and a particular location within the network. The prior art routing techniques can be divided into source routing and destination routing techniques. In source routing, each node in the network has knowledge of the exact route to be used to send messages to all possible destinations. This precomputed route information is included in the message or data packet as it starts its journey. Each intervening node along the predefined route uses the route definition in the message in order to make forwarding decisions. The problem with this approach, particularly for message-based systems where the network topology may change dynamically, is how to endow the nodes with knowledge of routes. (The term "message" is used hereafter as a general reference to a unit of data which is transferred between processes, and therefore includes all messages and data packets, and all units of data transmitted between processes whether the data is for application-processing or relates to systems management or monitoring).

Source routing is disclosed, for example, in WO 93/16539. Each device maintains a routing list which gives the preferred communication path to every other device in the network. Dynamic reconfiguration of the network is dealt with by each device periodically sending a beacon message to all other devices, informing them of its presence in the network. Communication paths having the shortest path length are stored at each node.

While beacon messaging has the advantage of not requiring operator input, it also has the problem, particularly in large and complex networks, of considerably increasing network traffic unless imperfect knowledge of the network status is accepted (as in WO 93/16539 where beaconing is periodic rather than in response to every change). If out-of-date information is used for routing determinations, network resources will be wasted and communication delays introduced by attempts to create routes which include unavailable nodes or links.

In destination routing, each node again maintains a routing table but the complete source-to-destination route for a particular message transmission is not precomputed and added to the message. Instead, each node along the route between source and destination generally determines where next to send the message in its journey towards the destination. A number of different approaches are known:

Local static routing involves static tables being maintained at the nodes in the network by the system administrators at each node. The term static implies that the tables are not updated by a programmed algorithm. The need for human intervention is a weakness in a complex, dynamically changing network.

Centralized static routing involves tables at the various network nodes being updated by a system administrator sitting at a central "point of control" (POC) node. This approach assumes that the POC can gain remote access to the controlled nodes.

Centralized adaptive routing involves an algorithm updating node routing tables automatically. The assumption of centralized techniques is that a designated POC is sent information from all nodes in the network regarding the state of their local network links. The POC first uses this information to build a topological model of the entire network, and then sends each node of the network the information it needs to build its local routing table. With this approach, there is a strong dependence on the POC node being operational at all times.

Local adaptive routing involves the selection of an outgoing link using a local heuristic. Examples include is algorithms that route based on message queue length, or on random selection, or on flooding (replicating the message on several links) or on observation or arrival patterns.

None of the above routing techniques works well in an environment in which the network configuration is dynamically changing, because of the considerable overhead in updating the information held by each of the network nodes together with the need both to ensure that interconnected nodes hold consistent information and to avoid the processing delays that result if communications have to wait while updates are performed, or while the POC is unavailable. The information which each node maintains for routing purposes must be reliably updatable if there is to be provision for the possibility of the network itself being reconfigured.

EP-A-0258654 discloses a network traffic routing and network management system in which a central computer has access to stored tariff data and uses this to determine on behalf of other nodes a routing policy which is then transmitted to the network nodes as routing instructions which are specific for each originating node and each destination.

Distributed adaptive routing is another technique known from the prior art. EP-A-0510822 discloses a distributed technique in which a circulating status table (CST) is forwarded to all nodes connected within a network, with each node updating the CST with its link and status information and obtaining from the CST and storing the most recently updated configuration information for the network. The function of monitoring the network topology is thus distributed among each of the nodes of the network, monitor software resident in each node being responsible for providing status information about that node and its communication links from locally-stored information which is periodically updated by the CST. This solution has severe limitations in large networks or networks where reconfigurations are frequent, since the CST may become out of date before it reaches all of the network nodes and because different nodes may have inconsistent information for unacceptably long periods of time.

EP-A-0568737 discloses routing logic for adaptive and distributed routing. Routing choices are made using local transmission delay information in combination with the "hop distance" (number of nodes along the route) to the destination node. The local transmission delay information is estimated by evaluating at the source node, prior to data transmission, partial routes between source and destination by means of signalling. Hop distances are calculated and compiled in a table at the particular node at which the calculation is performed, for use in selecting a partial route for data packet transmission. Since hop distance is a less dynamic parameter than most forms of topological information, an assumption of the reliability of the hop distance parameter is made without much signalling, reducing the signalling and processing overhead as compared with logic which requires evaluation of the entire route.

EP-A-0426911 discloses an example routing management system in which each node includes a dynamic routing table containing a plurality of machine identifiers and, for each, the next place in the network to which a message for that machine should be directed. The system of EP-A-0426911 requires a database of machine listings, including update and routing information for each machine. The update information identifies the parts of the system which need to be updated to maintain consistency if some part of the machine's database entry is changed, including information as to which nodes require their dynamic routing tables to be updated in response to a change to that entry. All relevant nodes are sent updated routing information. The amount of information that must be held by each node and the overhead in updating that information are both considerable.

It is desirable here to refer to the layered architecture structure of networks, for later reference. International architecture standards have been, and are being, developed to promote commonality and heterogeneous interoperability for all users of information technology and communications. A significant aspect of these standards are the international standards for Open Systems Interconnection (OSI) and the Systems Network Architecture (SNA). OSI and SNA both define seven-layer communications architectures in which each layer makes use of the services of the layer below and provides services to the layer above. This layered architecture structure can be represented as in FIG. 1 (taken from R. J. Cypser, "Communications for Cooperating Systems OSI—OSI, SNA, and TCP/IP", Addison-Wesley, 1991, p48. The figure uses OSI names but is generally applicable to OSI or SNA. (The somewhat different names and approximate relationships between the SNA and OSI layers are represented by Cypser in the above-referenced book at page 47—Cypser's FIG. 3.2).

The lower three layers of the OSI and SNA communication architectures (the "transport service providers") include transmission subnetworks such as X.25 packet switching networks, LANs, ISDN, WANs, and other network and link layer protocols. Subnetworks will generally be divisible from the whole network into separate administrative units known as "cells", cell names generally being important for inter-cell communications. The networks may be highly complex, with many intermediate nodes being involved in any data transmission between source and destination nodes. Layer 1 of the architecture is the physical connections between adjacent nodes, wires along which electrical signals pass.

Layer 2 is the data link control layer, providing fixed path configurations (point-to-point connections, multipoint connections and LANs) and possibly link-layer flow control and link-layer error-recovery. Layer 2 may also provide multi-path routing between intermediate nodes.

Layer 3 provides a subnetwork (e.g. LAN, ISDN) for multi-path routing between source and destination nodes and provides flow control within the subnetwork (e.g. multiplexing, segmenting). Layer 3 also provides internet-working links between the subnetworks.

The transport control layer 4 oversees communication across multiple underlying transport facilities. Source-to-destination transport reliability (e.g. by enciphering of data or sequence numbering) and flow control are provided by layer 4. OSI layer 4 (and the top of layer 3) corresponds to the position in the layered structure of common communications protocols such as TCP/IP (Transmission Control Protocol/Internet Protocol suite of protocols) and NetBIOS, being the providers of end-to-end reliable stream delivery.

Layer 5 is a data exchange layer providing a set of common signals used by applications for synchronization and regulation of the data exchange. Layer 6, the presentation services layer, interprets API verbs and converts data where communicating end users require different syntax and formats.

Layer 7 is the layer providing immediate service support for applications (called the application services layer in OSI and transaction services layer in SNA). Layer 7 provides file transfer, directory services, store-and-forward messaging, and system management. Directories are repositories for information, directory services being the combination of the repositories and processes which make use of the repository information to locate a named resource, i.e. name resolution. Originally created solely for the purpose of enabling client processes to contact a suitable server within the same network cell, directory services have recently been developed to provide other name resolution functions such as look-up access for nodes outside the immediate cell. Global directory services are also now available for name resolution between different cells in addition to the directories, for intra-cell resolution. Nodes initially contact a local directory service to locate a named resource, and if the local directory does not contain the particular resource name then the global directory service will be contacted to point to a different local directory service (generally using cell name resolution) which has the information for locating the required resource. Distributed directory services are also known in the art, directory information being located at network sites where it is commonly required.

Hereafter, the terminology of OSI is used to identify different layers of the network architecture. This use of terminology specific to a particular layered network architecture model is used for simplicity and to aid understanding and should not be interpreted as a limitation on the applicability of the present invention.

SUMMARY OF THE INVENTION

In view of the foregoing, it is therefore an object of the present invention to minimize the amount of data which must be held at each network node for efficient routing between processes, and thereby to reduce the overhead of maintaining and updating this information if the network changes.

The present invention provides a data communications system and a method for determining a route for communication between nodes of a distributed communications network, characterized in that information for the determination of a route for communication between nodes is provided to a node when said node requires determination of a route for sending a communication therefrom, said node determining a route using said provided information, said information being provided by a distributed directory service including a directory service information base accessible from each network node, the directory service maintaining network configuration information for each network node.

Preferably, the configuration information comprises a list of which other network nodes are directly connected to each node. In this context, the meaning of "directly connected" is that logically the nodes are immediate neighbors. There is not necessarily a dedicated synchronous communication session in existence between the "directly connected" nodes, but they are the next nodes to which messages will be passed and from which messages will be received. The phrase "directly connected" is also not intended to imply that the physical links between the nodes are simple direct connection, since the underlying physical network will frequently be transparent to communicating processes.

Provision of information to nodes from a directory service when the information is required for a routing determination (rather than periodically or whenever the network configuration changes) avoids the need to maintain network configuration tables at each network node for the purpose of message routing. If the information held in the directory for each node is minimized, maintenance of the directory's information for message routing may comprise each network node updating the directory only when its configuration of directly connected nodes is changed. To avoid duplication of effort in repeating a route determination, however, some routing information may be retained in a node after it has been provided from the directory service (the decision as to whether to retain such information is determined by whether system performance would be improved, and so depends on the particular network). The use of a directory service to provide information for route-determination between processes is not known from the prior art.

Access to the directory service is preferably available from each network node via network links which are independent of application level program-to-program links. In particular, we may rely on lower level routing such as provided by TCP/IP to access the directory service to obtain information to implement application level routing. Both the application level routing and the TCP/IP routing are in turn exploiting network level routing. The links used for the routing involved in accessing the directory service need not be the same links involved in application message routing. By way of explanation, message routing is between nodes of a network (or between application programs via communication management programs which support the application programs), and network hardware which is not part of the logical network of nodes defined for message routing is generally invisible to communicating processes even though its existence may, at the physical connection level, be essential to enable their communication. Access to the directory may be provided via underlying TCP/IP or SNA links, for example, regardless of whether an application level link between the relevant nodes is currently available.

According to a preferred embodiment of the invention, there is thus no requirement for an application-to-application link to be operational between a node and the network location of the directory service for that node to obtain routing information from the directory service. The avoidance of dependence on the existence of operational application-level links to the directory service, by alternatively making use of the available underlying transport facilities, increases directory service access reliability such that the ability of any node to access the directory service can be assumed. This assumption in turn enables individual nodes to be made reliant on the directory service to provide all routing information, such that the information does not have to be replicated at the node itself. (If each node were reliant on an application-level communications session with the directory service being available, then routing to the directory service would be more complex and a failure to obtain such a session would make routing impossible). This use of a directory service represents a major advantage over replicated routing tables since it avoids the need for propagating network configuration updates to every node for which message routing would be affected by the configuration change, and in certain implementations will automatically ensure that all nodes see consistent information at all times (although automatic consistency is not an essential feature of implementations of the invention in which some information is cached at individual nodes).

The statement above that access to the directory service can be assumed is intended to mean that the use of this assumption in the design of a system for message routing does not result in unacceptable communication system performance, rather than meaning that access will always be available from all nodes.

The provision of a directory service accessible from all nodes requiring a routing determination also enables the minimization of the total information which needs to be available to facilitate routing, not just in terms of the avoidance of replication at multiple network nodes but also in terms of the type of routing information which must be stored. The minimum information which must be stored for any given node for routing of data transmission units according to the present invention is a list of the other nodes to which that node is directly connected. A second aspect of the present invention is a method of determining routes for data transmissions between network nodes which method requires only this information of directly connected nodes.

According to a second aspect of the present invention, there is provided a method for determining a route for communication between a source node and a destination node in a communications network in which all nodes have access to a distributed directory service storing information as to which network nodes are directly connected to which other network nodes, the method comprising:

starting with a first one (start node) of the source node or the destination node, identifying from the directory which network nodes (first neighbor nodes) are directly connected to the start node, and then determining whether any first neighbor node is the second one (end node) of said source and destination nodes;

responsive to a negative result of said determination, identifying from the directory which network nodes (second neighbor nodes) other than the start node are directly connected to each of said first neighbors, and determining whether any second neighbor node is the end node;

and continuing this progressive evaluation of partial routes via intermediate connected nodes until the route-determination process identifies a node which is directly connected to the end node, thereby determining a complete route for communications between the source node and the destination node. The directory is updated when the network configuration changes, by updating the directory's stored configuration information for each node for which the set of that node's directly connected nodes is changed.

Clearly, accessing the directory service to provide information for the determination of appropriate routes for communication avoids dependence on signalling to discover a route (in this context, "signalling" refers to use of specialized messages to seek out a route for message data transmission, thereby creating actual network traffic between the source node and the destination node to determine the route between them). The route determination process of the present invention requires communication between the node requiring the routing determination and the directory service, but does not require actual messages to be sent along potential routes to determine their validity.

The present invention's identification of a route for communications using the directory service may be used in a source routing method, with each data transmission unit being provided with the route definition information such that each node which receives the data transmission unit can examine the route and forward the data appropriately. However, since this precomputed route could be invalidated before the data transmission unit reaches its destination (e.g. by one of the links being permanently removed), a preferred embodiment of the present invention involves destination routing in which each intermediate node along the route uses the directory service to provide information for determining only the next node along the route; that is the route-determination process performed at a node determines a complete route but outputs only the identification of the next node along the route which is to be used for message routing.

The route determination process of the present invention preferably involves a searching process, which process is running at a node of the network which requires a routing determination, accessing a local directory service which holds network configuration information for the local cell. If the local search determines that the destination node is not within the local cell (or if this is indicated before a local search is initiated, for example by specifying a cell name), then a global directory service is used to locate the local cell of the destination node for the determination an appropriate route. Thus, the present invention in a preferred embodiment makes use of a distributed directory service: the directory service is a distributed application which allows values to be retrieved from the directory by name.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
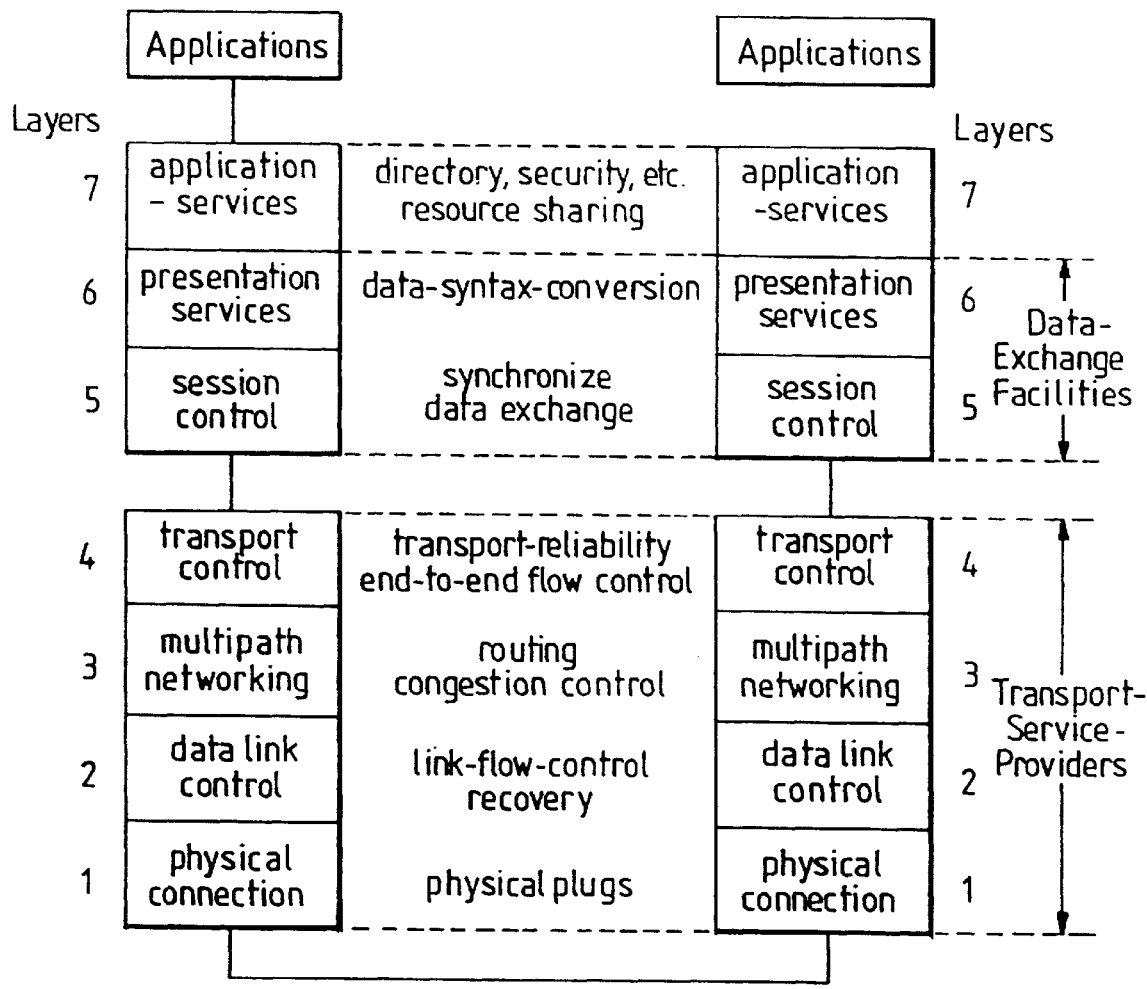
FIG. 1 is a schematic representation of the layered structure of the OSI network architecture, showing names and functions performed at the various layers.
Figures 2, 3:
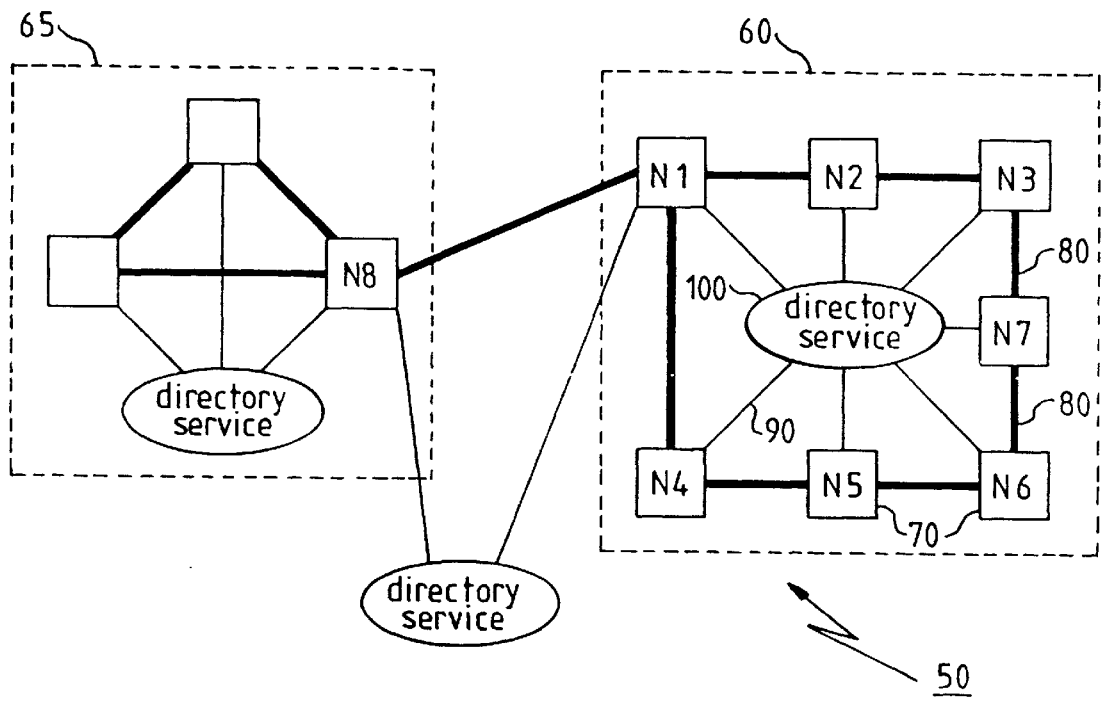
FIG. 2 is a schematic representation of a communications network in which each network node has access to a directory service, according to an embodiment of the present invention.
FIG. 3 shows an example of the network configuration information held in a directory service, according to an embodiment of the present invention.

A communications network is represented schematically in FIG. 2. Within the overall network 50 are a plurality of administrative subnetwork units 60 and 65 known as cells. Each cell may include a plurality of network nodes 70. As an example, a network node may be a server process, such as an air-line booking service, running on a computing device such as an IBM AS/400 computer (running OS/400 operating system software). Nodes may also comprise, for example, processes running on an IBM PS/2 personal computer running OS/2 operating system software, or on an IBM RISC System/6000 running AIX, all within the same network. In the client-server model of distributed processing, some of these nodes will be server processes connected for communication to computing devices on which client processes are located (e.g. an AS/400 computer may have a plurality of workstations connected thereto). Some client processes may not need to be involved in network routing, other than requiring communications access to a particular server, and such processes are not nodes requiring access to a routing directory service. Display terminals, workstations, printers and like devices which do not require routing determinations may be connected to the network nodes (these are not shown in FIG. 2). A single computer may have a plurality of client and server processes installed thereon, together with the networking software required for these processes to work with processes located elsewhere in the network. (The following are trademarks of International Business Machines Corporation: IBM, AS/400, OS/400, PS/2, OS/2, RISC System/6000, AIX).

The communications network via which different processes interoperate may be viewed on a number of levels, in accordance with the layered structure of the network architecture referred to earlier. At the lowest level, there are the physical connections linking nodes, the wires along which electrical signals are transmitted. Common communications facilities such as TCP/IP, NetBIOS or SNA TC/PC are provided on top of (and making use of) the underlying physical links, to ensure reliable data delivery. Available in some networks, as a next layer up from TCP/IP facilities, is the Open Software Foundation's (OSF) Distributed Computing Environment (DCE), including common communication protocols, systems management and data services which provide a degree of transparent computing in heterogeneous operating environments. DCE is described in the aforementioned book by R. J. Cypser, "Communication for Cooperating Systems—OSI, SNA and TCP/IP", Addison-Wesley, 1991. Also at a higher level of the network than the network layer, and independent of DCE, are the logical links 80 between nodes, the communication paths between processes.

DCE provides a directory service to enable shared use of information independent of location, system or local naming conventions. DCE is certainly not the only environment where directory services are available, but the DCE directory service is currently more advanced than the known alternatives. A directory service is represented in FIG. 2 as a resource which is accessible from each network node, the service being represented separately for each cell within the overall network. In practice, the directory service is implemented in the preferred embodiment of the present invention as a repository at a single designated Point of Control (POC) node for each cell (for example, the directory service for cell 60 could in practice be located at node N1). As an alternative, the directory service could be distributed over a number of cell nodes, or duplicated if it were felt necessary to protect against failure of the POC. The directory service presents a single logical view of the network to all nodes, even in the implementations in which it is partitioned.

It will be recognized that the access lines 90 shown in FIG. 2 between each node and its directory service are merely representations of the availability of access. Each node's access to the directory service will in practice be via underlying network links, making use of the communication services (such as TCP/IP) which are available on those links, but DCE provides a degree of transparency from the TCP/IP level of the network. The access lines 90 between nodes and the directory service location are represented as being independent from the logical links 80 between nodes because the network as viewed by communicating network nodes (processes) may be different from the network of available DCE services, so therefore the network topology at the application level may appear different to the topology which is apparent via DCE. Network nodes see the network as a plurality of nodes and communication paths between them (e.g. recognizing that N1 can send a message to N3 via N2) but with the underlying network (which may be highly complex) being transparent. This transparency is a feature of the application-enabling software which is installed at each network node.

Having recognized that the directory service may be contacted via network links which are not necessarily available as application-level communication paths (i.e. that the topology of network links as viewed by communicating application programs may be different to the network links as used for contacting the directory service), it should be noted that methods of accessing a directory service are known in the art, although not for the purpose of obtaining message routing information. The method of accessing the directory service according to the preferred implementation of the present invention using the DCE directory service is described below.

While a directory service can be provided with a large amount of information for which shared access is required, in the preferred embodiment of the present invention tie configuration information held by the directory service is minimal. That is, the directory service initially holds for each registered (see below) network node a list 115 of the node's immediately adjacent neighbor nodes within the cell, those nodes to which the particular node directly connects for interprocess communication, and no other configuration information. FIG. 3 shows tabulated (table 110) the configuration information maintained by the directory service 100 of cell 60. It should be noted that the cell's local directory service may hold information 120 for communications outside the cell (e.g. information that node N1 directly connects to node N8, or the cell name for services available at node N8). In the preferred embodiment, the local directory service is triggered to contact a global directory service to provide connection information when a route determination process requires information for connections outside of the local cell. The global directory service provides information enabling connection to an appropriate directory service to continue the route determination process (that is the global directory service is not a repository holding network configuration information for the whole network but is rather a vectoring agent enabling location of required information).

A network node registers itself with the directory service when it joins the network (e.g. at start-up following a period during which the network node device was powered off, or when the node is "created" in the network), identifying itself by name and listing its directly connected nodes and characteristics such as what services are available at the particular node. Other nodes can then contact the directory when they require a particular service, to find the name of the node which should be contacted. The directory information is automatically maintained by each node, notifying the directory service whenever there are changes to its local configuration. No administration is required beyond that needed to define the local network connections.

When the invention is implemented in DCE, the directory entry for a given node is held in the DCE directory service of the cell to which the node belongs. The directory service for each node is identified by the node's fully qualified DCE name (i.e. a unique name within the network for that node). The name of the entry is computable from the name of the node. A standardized hierarchical directory structure is used. It is known in DCE to partition the directory structure to keep entries of different kinds separate from one another.

A particular subdirectory, under the cell root, is typically created for each cell, nodes within the cell appearing as entries in this subdirectory. The least significant part of the name thus distinguishes individual nodes in a given cell.

The directory entry contains, as attributes, the fully qualified DCE names of the nodes to which it is directly connected. Directory attributes are data elements which can be stored in the directory entry. The attributes can be retrieved from the directory entry for a given node.

The use of fully qualified DCE names allows the directory service to locate the entry for any node by name, regardless of the cell in which the node's information is stored, and independent of the cell from which the enquiry is made. This is a known property of the DCE directory service.

Figure 4:
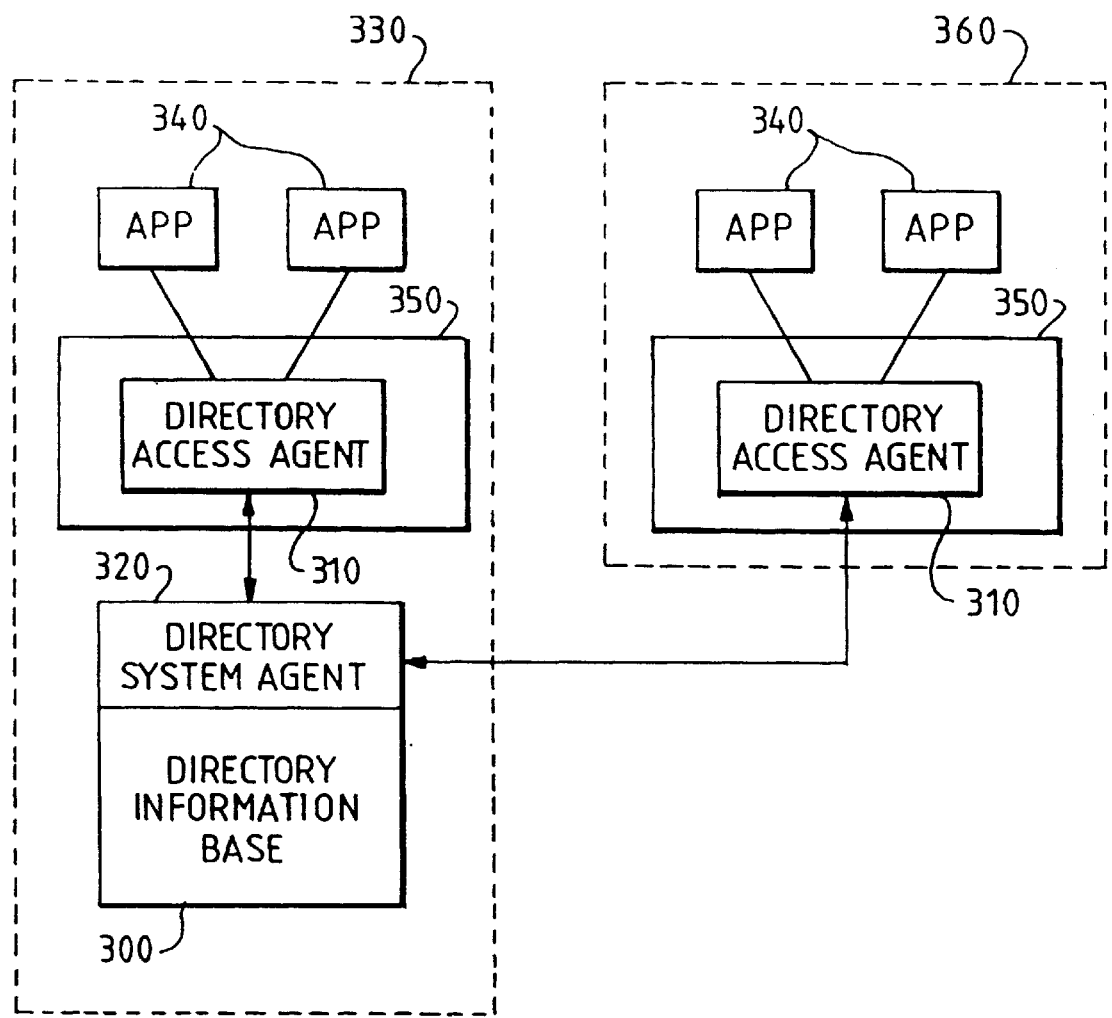
FIG. 4 is a schematic representation of the system components involved in accessing a directory service.

A network node which requires determination of a route for sending a message to another network node (e.g. when a client process at node N1 wishes to request some action by a server process at node N6) first accesses its local cell directory service. As represented schematically in FIG. 4, access to the directory service information 300 is provided by a directory access agent 310 in each node. The directory access agent will generally be an integral component of a communications manager 350 installed on a data processing system 360 within the network. The access agent contacts an intermediary, a directory system agent 320, in the network entity 330 at which the directory service information is located. The network entity 330 is generally a selected one of the computer systems which are connected for communication within the network. All application processes 340 use a directory access agent 310 to contact the directory system agent 320, and these components together form the means for accessing information from the directory service information base 300. The directory system agent understands a defined protocol for directory searches. The access agents understand the directory protocols and shield the applications from details of the directory service itself. One protocol is used for directory system agents in different nodes of the distributed network (where different parts of the directory information may be located) to communicate with each other, whereas a second protocol is defined for directory access agents to send updates to the directory's information and to request information from a directory system agent.

The directory service is preferably distributed across a plurality of network nodes. In particular, there may be a designated node within each cell of a distributed cell-structured network at which a local portion of the total directory service information base is located. With this distributed directory service structure, the route determination process is run as described below, with evaluation of the connections between nodes for which information is held within the local directory information base. Whenever connection information is required for a node for which information is not held in the local directory service information base, the local directory service automatically employs a global directory service to identify the appropriate other cell's directory service from which the required information for route determination can be obtained.

The other cell's directory service is thus accessed as a continuation of the route determination process (there thus being no requirement to notify the current node that full route determination information is not available from the local directory service information base alone).

Figure 5:
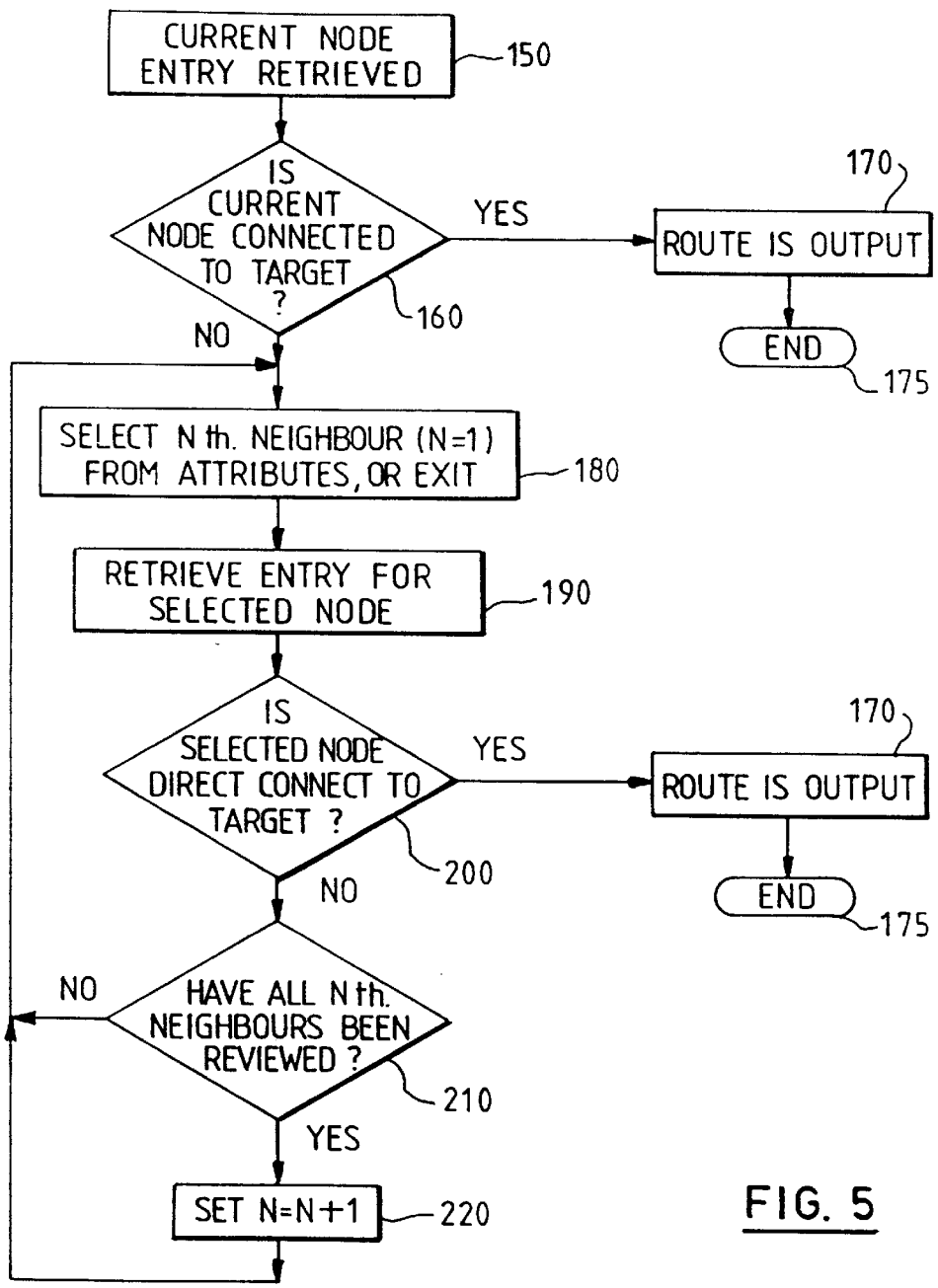
FIG. 5 is a flow diagram of a process for route determination, according to an embodiment of the invention.

The steps of the route-determination process are represented schematically in FIG. 5. The entry for the current node is retrieved (step 150) from the directory on request by a route determination process running at the current node. This entry will be in the local cell's directory service. The attributes are retrieved along with the entry itself. These attributes comprise the list of directly connected nodes (nearest neighbors). The route determination process then checks (160) whether any of the directly connected nodes is the target node (N6 in our example). If the result of this check is negative, the route determination process evaluates (180,190,200) whether any of the nearest neighbor nodes is directly connected to the target node, by querying each node within the list in turn (steps 180–210) to discover their connected nodes. If the retrieval of directory entries for each of the nearest neighbor nodes does not identify a direct connection to the target node (as in the example), then the route-determination process repetitively retrieves directory-service-entry information for nodes which are directly connected to the nearest neighbor nodes, i.e. takes the next step (220) away from the source node until a connection to the destination node is identified. Each time a directory entry is queried, its attributes are retrieved, allowing the routing algorithm to proceed as described above. If the attributes of a directory entry show there to be no nearest neighbor nodes other than those which have already been involved in the present search for a valid route, then there is no valid route along that branch of the propagating route evaluation and the evaluation of the particular partial route is exited (180).

The process thus evaluates, in parallel, partial routes from the source node via each of its immediately adjacent nodes and via each of the further nodes directly connected to these immediately connected nodes, until a node is discovered (at step 200) which is directly connected to the target node. The route determination process terminates (175) when a complete route has been found and route information has been output (170), or when it has been proved that no valid route exists (i.e. when all partial route evaluations have exited). Since the node entries in the attributes are fully qualified names, the directory service will be able to locate the data even if it is outside the local cell, because all of the information in the directory service is available to any node.

The use of fully qualified DCE names (i.e. names unique for the network) allows full exploitation of the globally distributed features of the DCE directory service. Simpler directory services may be used in alternative embodiments of the invention. The only requirement is that each entry can contain a list of related entries, each of which can itself be queried.

The route information which is output (step 170) following successful determination of a route is an identification of the next node from the source node to which messages should be sent on their way to the destination node. When such messages are transferred to a new node using this routing information, if the receiving node is not the destination node then it becomes a new source node requiring a routing determination for the onward transfer of messages. The route-determination process is thus repeated for the new source node, the process identifying a complete route but only using the identification of the next node for onward transmission of messages.

Figure 6:
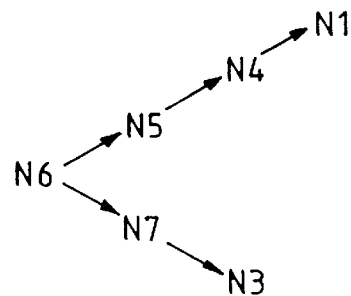
FIG. 6 shows an example of the iterative steps of route discovery according to an embodiment of the invention.

In the above description, the route determination process started from the source node (current node) and evaluated partial routes in steps towards the destination. The route determination process may equally start from the target node (since each of the current node and target node must be input when the route-determination process is initiated). An evaluation which begins at the target for message routing is exemplified in FIG. 6, with reference again to FIG. 2 and our example of N1 requiring a route to N6. Firstly, the directory entry for N6 is retrieved. On recognition that N6 is not directly connected to N1, the route determination process selects, from the directory entry attributes, nodes directly connected to N6. These are N5 and N7. For each of N5 and N7, selected in turn, the directory service entry (including local network configuration information as attributes for each node) is retrieved and directly connected nodes are determined, N4 and N3 respectively (the branch to N6 is ignored since N6 has already taken part in our evaluation). Since neither of these nodes is directly connected to N1, the directory entries for N4 and N3 are retrieved in turn. N4 is found to be directly connected to N1. A route from N1 to N4 to N5 to N6 has thus been identified. The route determination process outputs (at step 200) the node name N4, such that N1 is instructed to route messages which are destined for N6 via N4.

In the above example (which refers to FIGS. 2 and 6), the route being investigated via N7 and N3 would also eventually be completed if the route determination process continued. The route evaluation is, however, terminated when a first route (in this case the shorter route via N5 and N4) is discovered.

As described above, the output of the route determination process for a given node (referred to as the source node) is, in a preferred embodiment of the present invention, simply an identification of the next node to which messages should be sent on their way to the target node. The output for such an implementation of the invention is thus not information as to the whole route. Having carried out the route-determination on behalf of a given source node, messages can be forwarded from that node. The receiving node then becomes the current node which requires a routing determination to be made for onward routing of messages. The route-determination process is again initiated and used to determine the next node to which messages should be sent. This method of route determination has the advantage that complex route information does not need to be added to the message traffic; each determination only identifies the next node for the message's next network hop towards its destination. A second advantage, particularly significant for large networks in which configuration changes are frequent, is that the identified route is not fixed after the first route determination, such that iterative next-node determinations following on from the first can identify a different next-node (i.e. a different route) if the network changes while the message is in transit between source and destination.

The disadvantage of outputting next-node identification only rather than outputting identification of the whole route is, of course, that the route-determination process will be repeated for each node along the route. For networks in which reconfiguration is sufficiently infrequent, a higher performance will be achieved by outputting identification of the whole route and then adding that information to the message transmission such that it can be read and used for routing by nodes which receive the message. This inclusion of routing information for the complete route within the message transmissions will be the optimum implementation of the present invention for many networks.

A limitation of the simple process described above is that, in large and complex networks, the number of node entries which must be retrieved from the directory for evaluation could become excessive. The present invention solves this problem by caching at the network nodes routes which are identified by directory service searches, such that the full algorithm for route discovery does not need to be performed every time traffic is sent along a given route. Thus, the route information output by the route determination is placed in local cache storage (i.e. cache storage at the same physical location within the network, and logically associated with the current node). The route information remains in this local cache after it has been used for message routing, and so is available for re-use if the current node subsequently requires a determination of a route to the same target node. The retention policy for cached information involves the setting of a time limit beyond which a cached entry is assumed invalid and is not re-used.

The caching technique introduces the possibility of changes to the network (and consequently to the information in the directory) invalidating the cached information before expiry of the time limit for assumed validity, and thus leaving the possibility of an invalid route being chosen. To avoid this, a route verification process is performed. The route verification process retrieves only the directory service information for the network nodes which form part of the cached route, and verifies that the connections are still valid from the current directory service information. This verification process can be seen to comprise a limited performance of the normal route determination process in which only specified intermediate nodes between the source and destination are investigated. If the cached route is found to be invalid, or if the time limit for assumed validity of the cached information has expired, then the normal route determination process is initiated.

An alternative solution to the potential problem of cached route information becoming invalid, which introduces Less verification overhead then the aforementioned route-verification method, is to use the cached information but to have techniques available to recover from situations in which a route becomes invalid. This solution introduces less overhead than the route verification method, but has a longer recovery time when the cached route is invalid. The recovery techniques of the preferred embodiment of the invention involve maintaining a file at a sender node of messages which have been transmitted by the sender node, each of these messages having an "in doubt" (or "uncommitted") status and not being deleted from the sender's file but being retained for possible resend, until confirmation is received at the sender node of successful receipt at the target node. Notifications are generated for messages which cannot be delivered. This store-and-forward technique is implemented in inter-process message queuing, such as in the MQSeries commercial messaging products which are commercially available from IBM. (MQSeries is a trademark of International Business Machines Corporation). Message queuing communication is described in IBM Document Number GC33-0805-00 "IBM Messaging and Queuing Series: An Introduction To Messaging and Queuing", and further in IBM Document Number SC33-0850-00 "IBM Messaging and Queuing Series Technical Reference", which are incorporated herein by reference.

Alternative "rollback" techniques are known in the art, such as the node which discovers the invalid route returning the message traffic to the originating node. However, this approach has the possibility of message loss if the node discovering invalidity of a route also discovers that there is no route back to the originating node. This could happen if a number of network changes were made simultaneously. This approach also requires that there is some mechanism for identifying the route back to the originating node. For implementations of the invention in which the message transmission does not include an identification of the complete route, locating the originating node requires a separate operation of a route determination process or use of additional caching of information of identified routes.

Following on from a rollback of the message transmission when invalidity of a route is discovered, the route-discovery process can again be initiated from the beginning, or the valid part of the cached route may be used together with a new partial route which is identified using the route-discovery process. The recovery-based approach to reducing the overhead of route determination is thus most suited to stable networks which change infrequently and in which "store and forward" facilities are provided, such as by IBM's MQSeries products in support of asynchronous message queuing. The route verification technique is more suited to unreliable or rapidly changing networks. Generally, the present invention is most suitable for middleware (i.e. application-enabling software) routing, since it requires that the directory support and networking be in place, and in particular the invention is advantageously implemented in a network of IBM's MQSeries queue manager middleware products for cross-network routing of messages. In such an implementation, the present invention will prevent individual MQSeries queue manager products having to determine the routes for message communication, thus avoiding the need for the individual administration which would be a requirement of local route determination.

The earlier explanation of different logical network topologies being visible at different levels of the network is exemplified in a message queuing network in which not all processing systems within the network necessarily have a queue manager running. The network of communicating nodes is the network of queue managers, but there may additionally be client processes within the network (located at the same or different physical network sites) which need communication access only to a specific queue manager process. In this example, only the queue manager processes will register themselves with the directory service (i.e. queue managers' clients will not) and the registration will be at the time the queue manager is created in the network (after installation and configuration but not waiting until the queue manager is actually running. The reason for requiring registration at this stage is that routing may be required in the queue manager even if the queue manager is itself unavailable. Referring to the aforementioned node naming conventions, where nodes are queue manager processes the least significant part of a directory service name (which is used to distinguish the nodes within a cell) will be the queue manager name.

It should be noted that, while the above description of the preferred embodiments of the invention refers to a route determination process running at the current node in the network which requires a route determination, embodiments of the invention in which each cell has a single specific node at which the directory service for that cell is located and in which each node requiring a determination initially contacts its local directory service could equally involve a route determination process running at the directory service node. This would mean the directory service nodes performing all routing determinations on behalf of requesting nodes.

To deal with the possibility of routes not being available when a search is performed, a search can be limited to a certain minimum time duration or to a maximum number of network hops within the route determination. If a route is not determined within the set time or other preset limitation, a response of "route unavailable" is then made to the node requiring the determination.

Such limitations may also be used to prevent search looping within a particular route determination leading to an endless search, although it is preferred to avoid looping by preventing the search process from reevaluating a node's connections subsequent to the node taking part for a first time in the particular route determination.

While the invention has been particularly shown and described with reference to a preferred embodiment, it will be understood by those skilled in the art that various changes in form and detail may be made therein without departing from the spirit and scope of the invention.

What is claimed is:

1. A method within a communications system for determining route information for communication between nodes of a distributed computing network, wherein said distributed computing network includes a plurality of nodes, a plurality of logical links connecting said plurality of nodes, and a distributed directory service which is accessible from said plurality of nodes via a plurality of access lines, wherein said distributed directory service further includes a directory service information base, said method comprising the steps of:

maintaining network configuration information for each of said plurality of nodes of said distributed computing network within said directory service information base, the network configuration information for a given node having a listing of directly connected nodes;

transmitting a first request for first route determination information on behalf of a requesting node of said distributed computing network to said distributed directory service across one of said plurality of access lines;

providing said first route determination information across one of said plurality of access lines from said distributed directory service to said requesting node utilizing said network configuration information in response to said transmitting step, the first route determination information including a plurality of listings of directly connected nodes;

determining a first route for communication between a source node of said distributed computing network and a destination node of said distributed computing network at the requesting node utilizing said first route determination information by evaluating partial routes based on the listings of directly connected nodes to discover an intermediate node which is connected to the destination node;

transmitting data across one of said plurality of logical links from said source node to said intermediate node within said distributed computing network utilizing a portion of said first route;

transmitting a second request for second route determination information on behalf of said intermediate node to said distributed directory service across one of said plurality of access lines, in response to said step of transmitting data to said intermediate node;

providing said second route determination information across one of said plurality of access lines from said distributed directory service to said intermediate node utilizing said network configuration information in response to said step of transmitting the second request; and determining a second route for communication between said intermediate node and said destination node utilizing said second route determination information, wherein said second route is different from a partial route, within said first route, between said intermediate node and said destination node.

2. A method as set forth in claim 1, wherein said maintaining step comprising the steps of:

establishing, at the origination of said distributed computing network, said network configuration information for each of said plurality of nodes within said distributed computing network; and updating, in response to a network configuration change, a portion of said network configuration information corresponding to only those listings of directly connected nodes affected by said network configuration change.

3. A method as set forth in claim 2, said updating step further comprising the steps of:

transmitting to said distributed directory service, an update signal across one of said plurality of access lines from at least one of said directly connected nodes affected by said network configuration change; and editing said network configuration information within said directory service information base utilizing said update signal.

4. A method as set forth in claim 1, wherein said providing step further comprises the step of:

caching said route determination information for subsequent utilization by said node.

5. A method as set forth in claim 4, further comprising the step of:

validating said cached route determination information prior to utilization by said node.

6. A method as set forth in claim 1, wherein said step of transmitting said data to said intermediate node further comprises the step of:

transmitting said first route across one of said plurality of logical links to said intermediate node within said distributed computing network.

7. A method as set forth in claim 6, said method further comprising the step of:

forwarding, from said intermediate node, said data across one of said plurality of logical links to one of said plurality of nodes within said distributed computing network utilizing said second route.

8. A communications system for determining route information for communication between nodes of a distributed computing network, wherein said distributed computing network includes a plurality of nodes, a plurality of logical links connecting said plurality of nodes, and a distributed directory service which is accessible from said plurality of nodes via a plurality of access lines, wherein said distributed directory service further includes a directory service information base comprising:

means for maintaining network configuration information for each of said plurality of nodes of said distributed computing network within said directory service information base, said network configuration information for a given node having a listing of directly connected nodes;

means for transmitting a first request for first route determination information on behalf of a requesting node of said distributed computing network to said distributed directory service across one of said plurality of access lines;

means for providing said first route determination information across one of said plurality of access lines from said distributed directory service to said requesting node utilizing said network configuration information in response to said means for transmitting said first request, said first route determination information including a plurality of listings of directly connected nodes;

means for determining a first route for communication between a source node of said distributed computing network and a destination node of said distributed computing network at the requesting node utilizing said first route determination information by evaluating partial routes based or the listings of directly connected nodes to discover an intermediate node which is connected to the destination node;

means for transmitting data across one of said plurality of logical links from said source node to said intermediate node within said distributed computing network utilizing a portion of said first route;

means for transmitting a second request for second route determination information on behalf of said intermediate node to said distributed directory service across one of said plurality of access lines;

means for providing said second route determination information across one of said plurality of access lines from said distributed directory service to said intermediate node utilizing said network configuration information in response to said means for transmitting said second request; and means for determining a second route for communication between said intermediate node and said destination node utilizing said second route determination information, wherein said second route is different from a partial route, within said first route, between said intermediate node and said destination node.

9. A communications system as set forth in claim 8, said means for maintaining comprising:

means for establishing, at the origination of said distributed computing network, said network configuration information for each of said plurality of nodes within said distributed computing network; and means for updating, in response to a network configuration change, a portion of said network configuration information corresponding to only those listings of directly connected nodes affected by said network configuration change.

10. A communications system as set forth in claim 9, said means for updating further comprising:

means for transmitting to said distributed directory service, an update signal across one of said plurality of access lines from at least one of said directly connected nodes affected by said network configuration change; and means for editing said network configuration information within said directory service information base utilizing said update signal.

11. A communications system as set forth in claim 8, wherein said means for providing further comprises:

means for caching said route determination information for subsequent utilization by said node.

12. A communications system as set forth in claim 11, further comprising:

means for validating said cached route determination information prior to utilization by said node.

13. A communications system as set forth in claim 8, wherein said means for transmitting said data to said intermediate node further comprises:

means for transmitting said first route across one of said plurality of logical links to said intermediate node within said distributed computing network.

14. A communications system as set forth in claim 13, further comprising:

means for forwarding, from said intermediate node, said data across one of said plurality of logical links to one of said plurality of nodes within said distributed computing network utilizing said second route.

* * * * *

UNITED STATES PATENT AND TRADEMARK OFFICE
CERTIFICATE OF CORRECTION

PATENT NO. : 6,092,096
DATED : July 18, 2000
INVENTOR(S) : Jonathan Rhys Lewis

It is certified that error appears in the above-identified patent and that said Letters Patent is hereby corrected as shown below:

Title page,
Item [57], ABSTRACT,
Line 1, delete "The".

Column 10,
Line 13, delete "tie" and replace with -- the --.

Column 14,
Line 17, delete "Less" and replace with -- less --.

Signed and Sealed this

Tenth Day of May, 2005

JON W. DUDAS
*Director of the United States Patent and Trademark Office*